US012268907B2

(12) United States Patent
Tilley et al.

(10) Patent No.: US 12,268,907 B2
(45) **Date of Patent: *Apr. 8, 2025**

(54) MODULAR, INTEGRATED POWERED AIR PURIFYING RESPIRATOR SYSTEM

(71) Applicant: D. Wheatley Enterprises, Inc., Belcamp, MD (US)

(72) Inventors: Greg A. Tilley, Monkton, MD (US); Brian Curlee, Joppa, MD (US)

(73) Assignee: D. Wheatley Enterprises, Inc., Belcamp, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/427,054

(22) Filed: Jan. 30, 2024

(65) Prior Publication Data

US 2024/0307711 A1 Sep. 19, 2024

Related U.S. Application Data

(63) Continuation of application No. 16/998,413, filed on Aug. 20, 2020, now Pat. No. 11,883,693.

(Continued)

(51) Int. Cl.

*A62B 7/10* (2006.01)
*A62B 7/12* (2006.01)

(Continued)

(52) U.S. Cl.

CPC .................. *A62B 7/10* (2013.01); *A62B 7/12* (2013.01); *A62B 18/006* (2013.01); *A62B 23/02* (2013.01)

(58) Field of Classification Search

CPC .... A62B 7/10; A62B 7/12; A62B 7/02; A62B 18/006; A62B 23/02; A62B 23/00; A62B 9/04; A61M 16/08; A61M 16/0816

See application file for complete search history.

(56) References Cited

U.S. PATENT DOCUMENTS

2007/0163588 A1* 7/2007 Hebrank ........... A61M 16/0069 128/205.29
2008/0196723 A1 8/2008 Tilley (Continued)

FOREIGN PATENT DOCUMENTS

CN 109603024 A 4/2019
DE 10 2014 013 817 A1 3/2016

(Continued)

*Primary Examiner* — Joseph D. Boecker
*Assistant Examiner* — Brian T Khong
(74) *Attorney, Agent, or Firm* — Whiteford, Taylor & Preston, LLP; Gregory M. Stone

(57) ABSTRACT

A modular, low profile PAPR system includes a blower, a filter rail chassis removably attachable to an inlet of the blower, a hose system removably attachable to the outlet of the blower, and a removable battery pack. The hose system comprises an ovular outer tube that maintains a generally flat profile for the hose as it extends across or along the operator's body. Two circular air carrying conduits are sealed within such ovular outer tube against outside contamination and provide a flat, small profile tube system that resists hoop stress applied to the outside of the hose, provides low resistance against bending, that will not inadvertently kink or seal in low radius turns, and that results in a low profile, non-collapsing hose system for delivering air from a remotely carried blower and filter assembly to the operator's protective mask.

17 Claims, 8 Drawing Sheets

Related U.S. Application Data

(60) Provisional application No. 62/889,263, filed on Aug. 20, 2019.

(51) Int. Cl.
*A62B 18/00* (2006.01)
*A62B 23/02* (2006.01)

(56) References Cited

U.S. PATENT DOCUMENTS

| | | | | |
|---|---|---|---|---|
| 2011/0056496 | A1* | 3/2011 | Tilley | A62B 9/04<br>128/205.27 |
| 2022/0288427 | A1 | 9/2022 | Tilley et al. | |

FOREIGN PATENT DOCUMENTS

| | | | |
|---|---|---|---|
| JP | H03-121080 | A | 5/1991 |
| JP | 2010-504170 | A | 2/2010 |
| WO | 2011/050626 | A1 | 5/2011 |
| WO | 2017/044582 | A1 | 3/2017 |

* cited by examiner

MODULAR, INTEGRATED POWERED AIR PURIFYING RESPIRATOR SYSTEM

CROSS-REFERENCE TO RELATED APPLICATION

This application claims priority to U.S. application Ser. No. 16/998,413, titled "Modular, Integrated Powered Air Purifying Respirator System," filed Aug. 20, 2020, now U.S. Pat. No. 11,883,693, which is based upon and claims the benefit of U.S. Provisional Application No. 62/889,263 titled "Modular, Integrated Powered Air Purifying Respirator System," filed Aug. 20, 2019, which application is incorporated herein by reference in its entirety.

FIELD OF THE INVENTION

This invention relates generally to modular, person-carried breathing apparatus, and more particularly to a modular, small profile powered air purifying respirator (PAPR) system.

BACKGROUND

Powered air purifying respirator ("PAPR") systems are commonly used by emergency response and other personnel working in hazardous environments, such as environments that may be contaminated with chemical, biological, radiological, and/or nuclear contaminants. Such systems typically include one or more filter cartridges and a blower assembly used to force air through the filter canisters and into a respirator or protective mask worn by the operator, thus providing clean, breathable air to the operator. While such systems are generally effective in providing a safe, breathable environment for the operator, they may comprise heavy, bulky equipment that makes wearing them difficult and fatiguing. Moreover, the physical space taken up by the components of such systems may make it difficult for the operator to use them in tight, small, or otherwise confined spaces. Even further, operators having differing mission goals may be equipped with various other equipment, such that a single typical PAPR system may make it difficult to incorporate all of the other equipment they would desire to carry.

It would therefore be advantageous to provide a low-profile, light weight PAPR system that may be easily worn and carried by an operator, and that may be readily customized in shape and general configuration to meet the space requirements on the body of the operator.

SUMMARY OF THE INVENTION

Disclosed herein is a modular, small profile PAPR system. In accordance with certain aspects of an exemplary embodiment, the system includes a blower, a filter rail chassis that is removably attachable to an inlet of the blower, and a hose system that is removably attachable to the outlet of the blower. The filter rail chassis is low profile and may be provided in one of multiple configurations that allow attachment of, for example, one to three filter cartridges. A power source may be provided in a variety of configurations, including a battery pack that is preferably removably attachable to the blower in a close, nested configuration abutting both the blower and the filter chassis to maintain the small profile of the system, and that may alternatively be carried remote from the blower with a power cord interconnecting the blower with the battery pack. Still further, the power source may comprise direct connection to an A/C or D/C power source. Such variable power configurations and filter configurations offer the user the opportunity to rapidly change the configuration of the PAPR, thus allowing ready adaptation to the particular environment in which the user is operating (i.e., through control of the air flow from the blower and the number of filters carried by the filter rail chassis). The hose system comprises an ovular outer tube that extends from a first connector (which attaches to the blower) to a second, opposite end (which attaches to an operator's protective mask), which ovular shape maintains a generally flat profile for the hose as it extends across or along the operator's body. Two circular air carrying conduits are sealed within such ovular outer tube against outside contamination. This assembly results in a flat, small profile tube system that, despite having an oval exterior shape, maintains a significantly higher hoop stress as a result of the circular tubes inside of the tube system that provides low resistance against bending and intentional curving (as may be desired by the operator to route the tube system around other equipment worn by the operator), that will not inadvertently kink or seal even with low radius turns, and that thus results in a low profile, non-collapsing hose system for delivering air from a remotely carried blower and filter assembly to the operator's protective mask.

In accordance with certain aspects of an embodiment of the invention, a powered air purifying respirator ("PAPR") assembly is provided, comprising a blower unit having an air inlet and an air outlet configured for removable connection to a hose system for delivery of cleaned air to a user, a filter rail chassis having a first closed end and a second open end and removably attached to the air inlet of the blower unit at the second open end of the filter rail chassis, the filter rail chassis having at least one chassis inlet configured to removably and sealingly receive a filter canister, and a portable power assembly removably attached to the blower unit, the portable power assembly having a bottom face that is aligned with a bottom face of the blower unit, the portable power assembly extending distally from a front face of the blower unit to a point adjacent to a portion of the filter rail chassis, and the portable power assembly having a top face at least a portion of which is positioned lower than a top of the at least one chassis inlet.

In accordance with further aspects of an embodiment of the invention, a powered air purifying respirator ("PAPR") assembly is provided, comprising a blower unit having an air inlet and an air outlet configured for removable connection to a hose system for delivery of cleaned air to a user, a filter rail chassis having a first closed end and a second open end and removably attached to the air inlet of the blower unit at the second open end of the filter rail chassis, the filter rail chassis having at least one chassis inlet configured to removably and sealingly receive a filter canister; a portable power assembly removably attached to the blower unit; and a hose system for delivery of cleaned air to a user, the hose system having a hose inlet removably attached to the air outlet of the blower unit and a hose outlet configured for attachment to a user's safety mask, the hose system further comprising two circular cross-section air carrying conduits extending between the hose inlet and said hose outlet, and an oval shaped outer tube extending between the hose inlet and the hose outlet and enclosing the two circular cross-section air carrying conduits.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized. The present invention is illustrated by way of example, and not by way of limitation, in the figures of the accompanying drawings, in which like reference numerals refer to similar elements, and in which:

DETAILED DESCRIPTION OF THE PREFERRED EMBODIMENTS

The invention may be understood by referring to the following description and accompanying drawings. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Descriptions of well-known functions and structures are omitted to enhance clarity and conciseness. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item.

The use of the terms "first", "second", and the like does not imply any particular order, but they are included to identify individual elements. Moreover, the use of the terms first, second, etc. does not denote any order of importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Although some features may be described with respect to individual exemplary embodiments, aspects need not be limited thereto such that features from one or more exemplary embodiments may be combinable with other features from one or more exemplary embodiments.

Figure 1A:
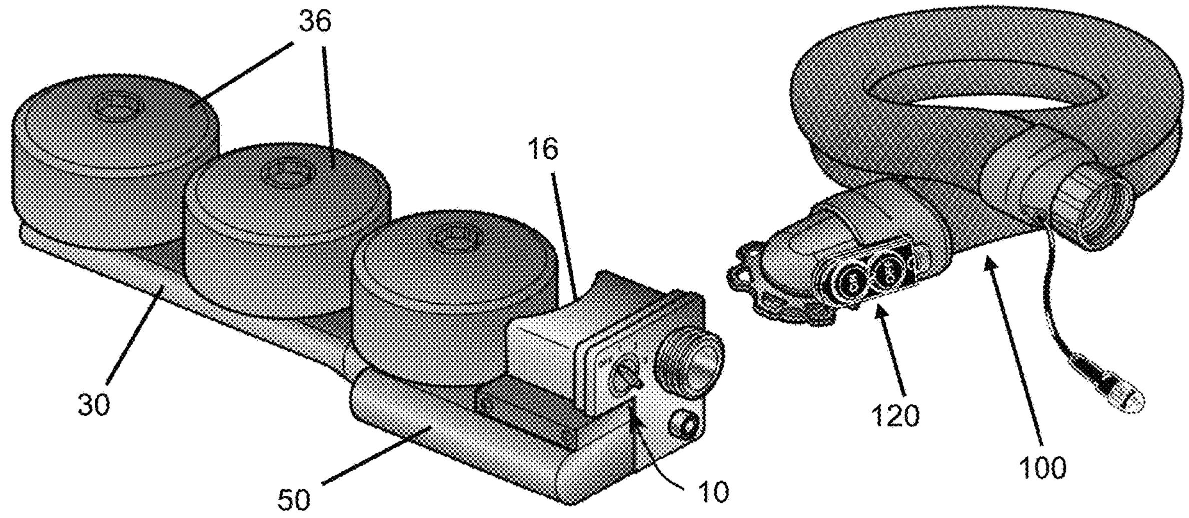
FIG. 1A is a perspective view of a powered air purifying respirator assembly in accordance with certain aspects of an embodiment of the invention.
Figure 1B:
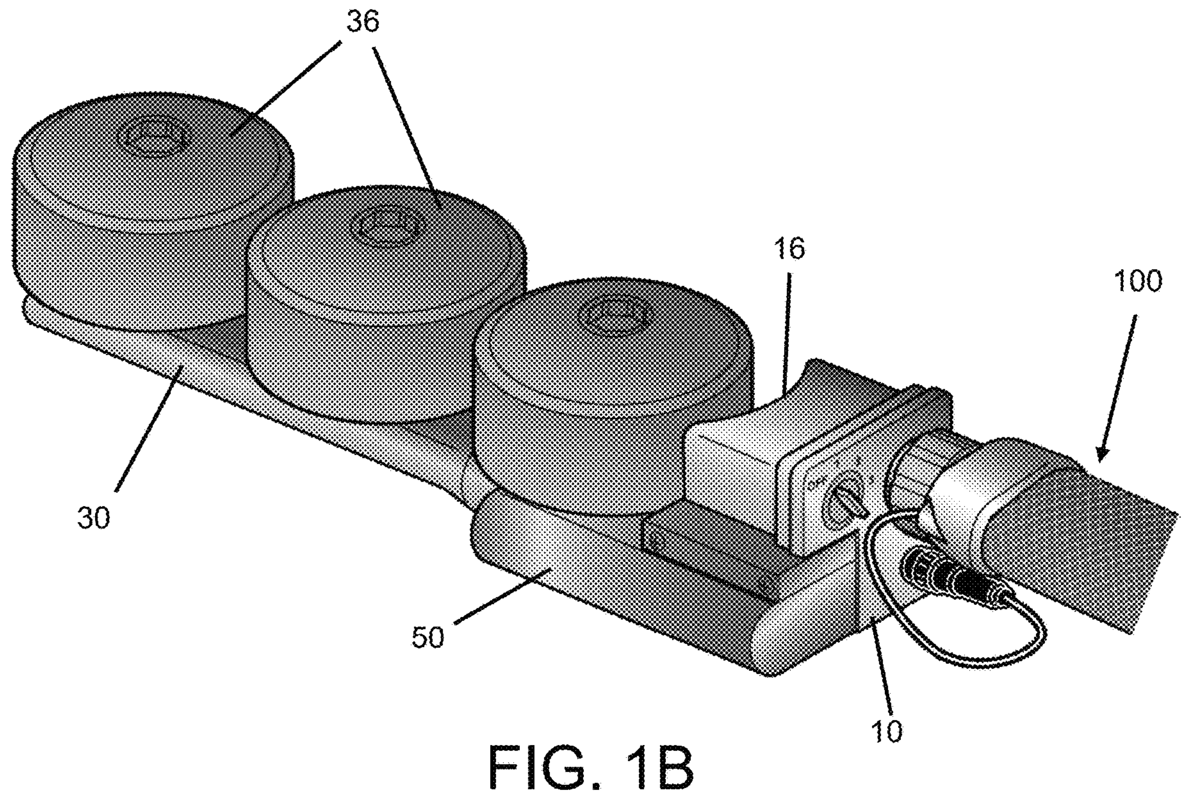
FIG. 1B is a close-up view of a portion of the powered air purifying respirator assembly of FIG. 1A and showing the hose system connected to the blower unit.
Figure 2A:
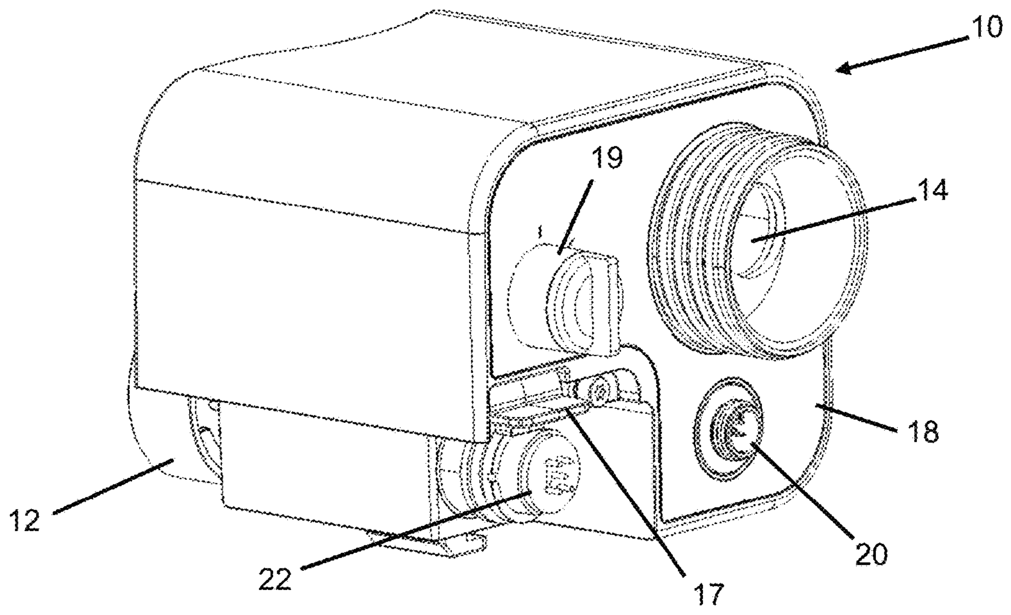
FIG. 2A is a front perspective view of a blower unit for use in the powered air purifying respirator assembly of FIG. 1A.
Figure 2B:
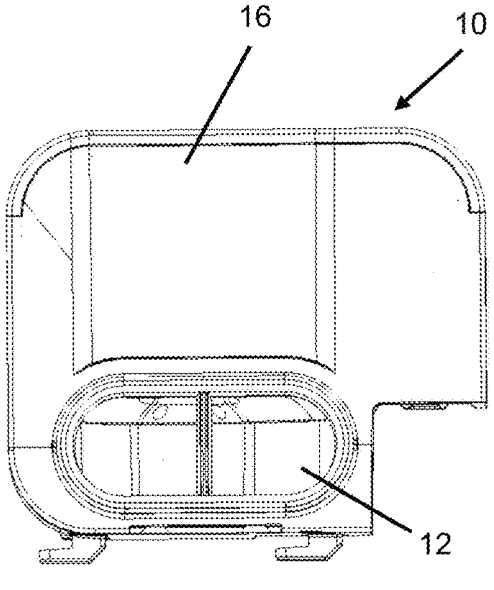
FIG. 2B is a rear view of the blower unit of FIG. 2A.
Figure 2C:
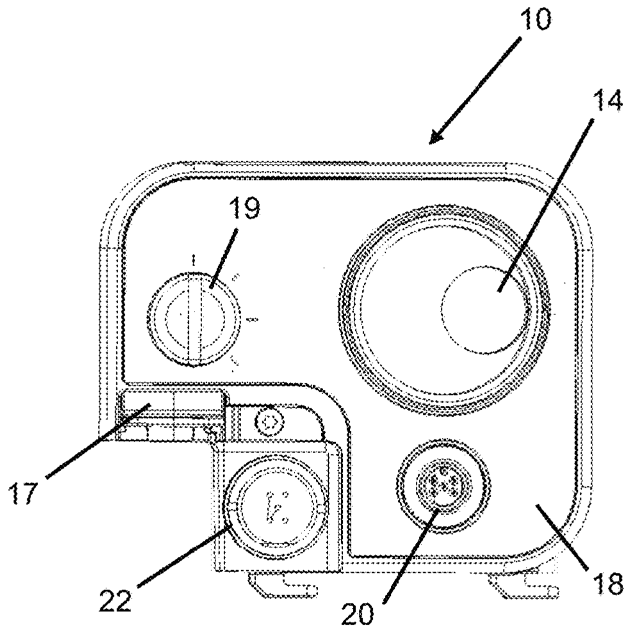
FIG. 2C is a front view of the blower unit of FIG. 2A.
Figure 3:
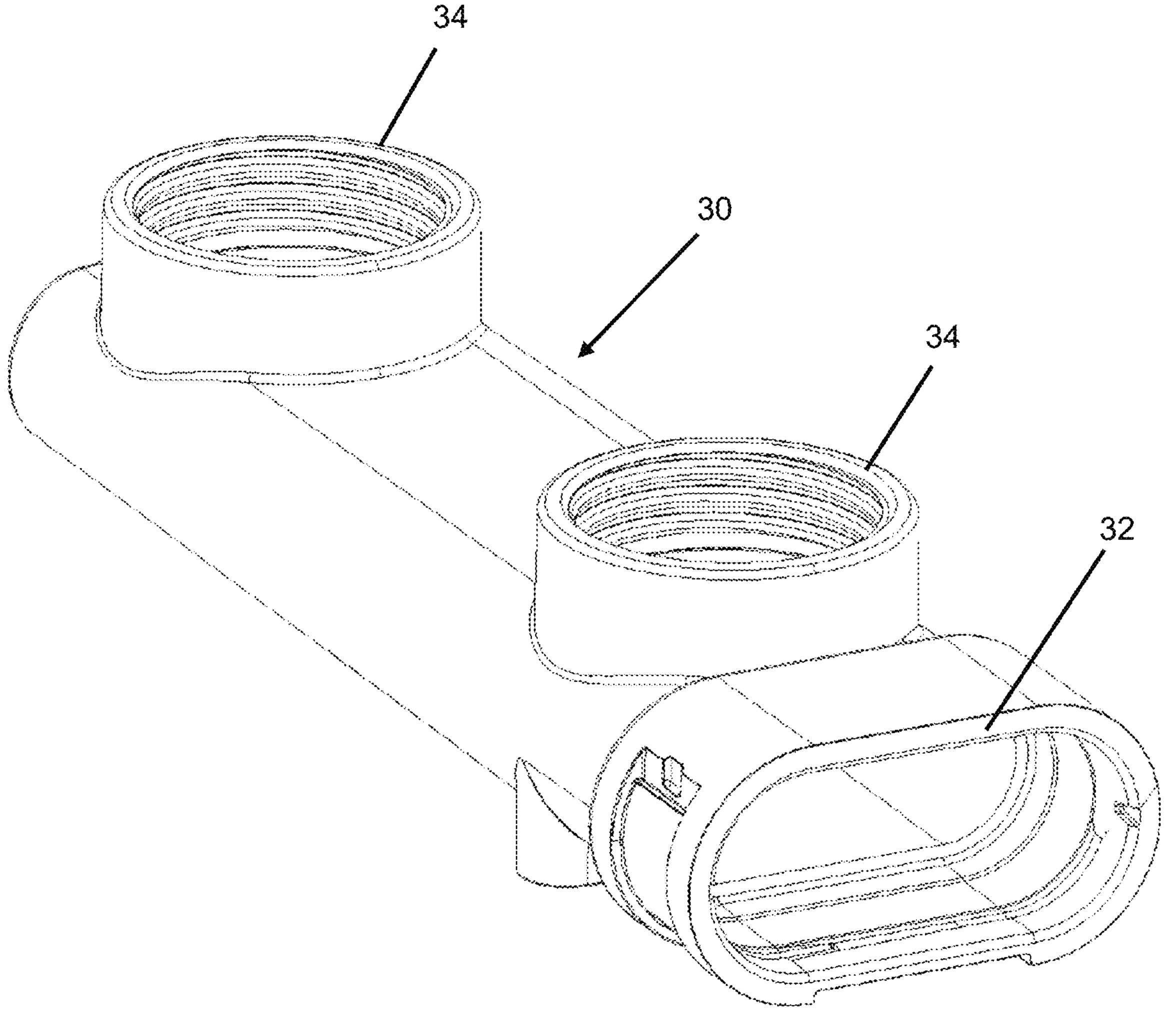
FIG. 3 is a front perspective view of a filter rail chassis for use in the powered air purifying respirator assembly of FIG. 1A.
Figure 4A:
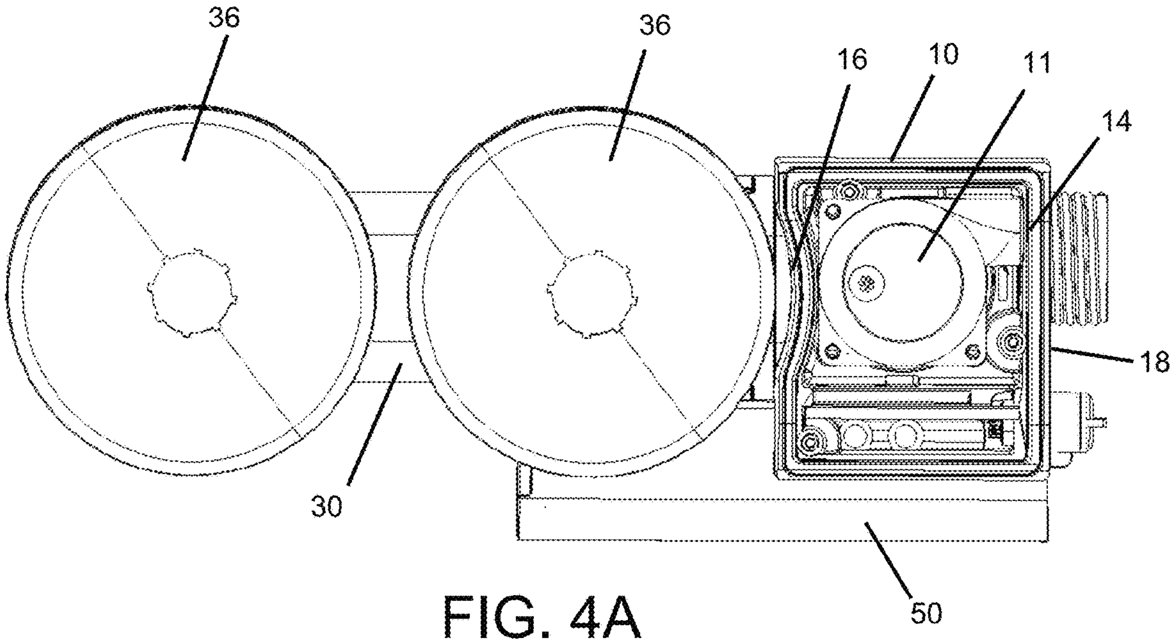
FIG. 4A is a top view of the powered air purifying respirator assembly of FIG. 1A with filter canisters installed and with a cover of the blower removed for clarity.
Figure 4B:
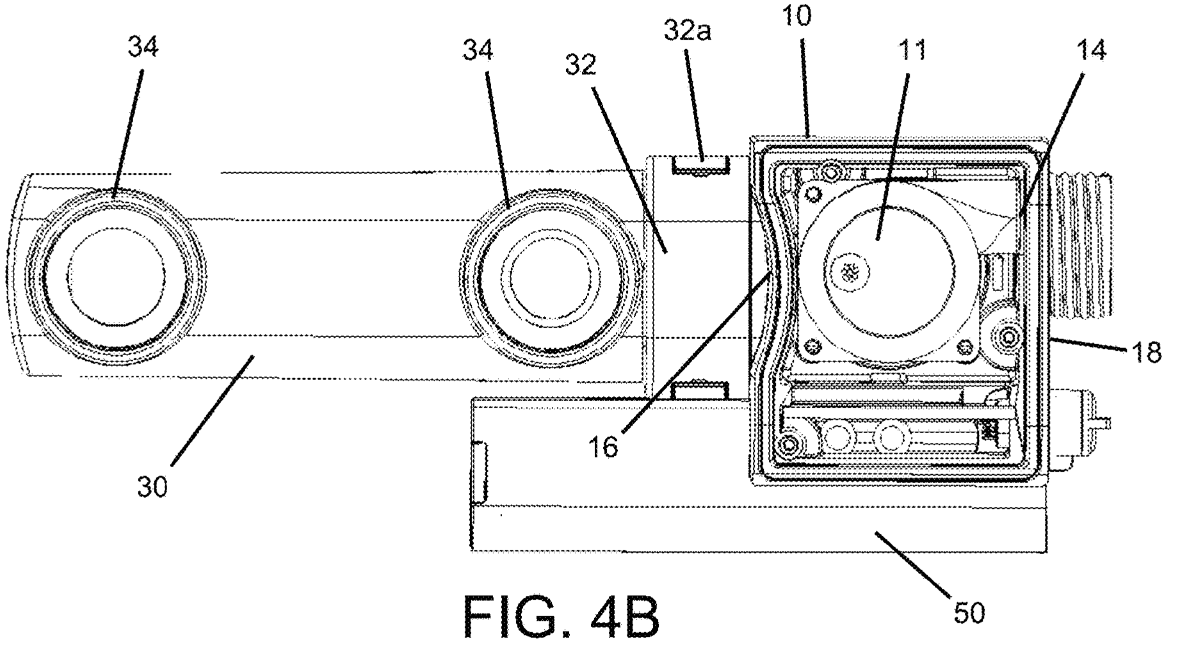
FIG. 4B is a top view of the powered air purifying respirator assembly of FIG. 1A without filter canisters and with a cover of the blower removed for clarity.
Figure 5A:
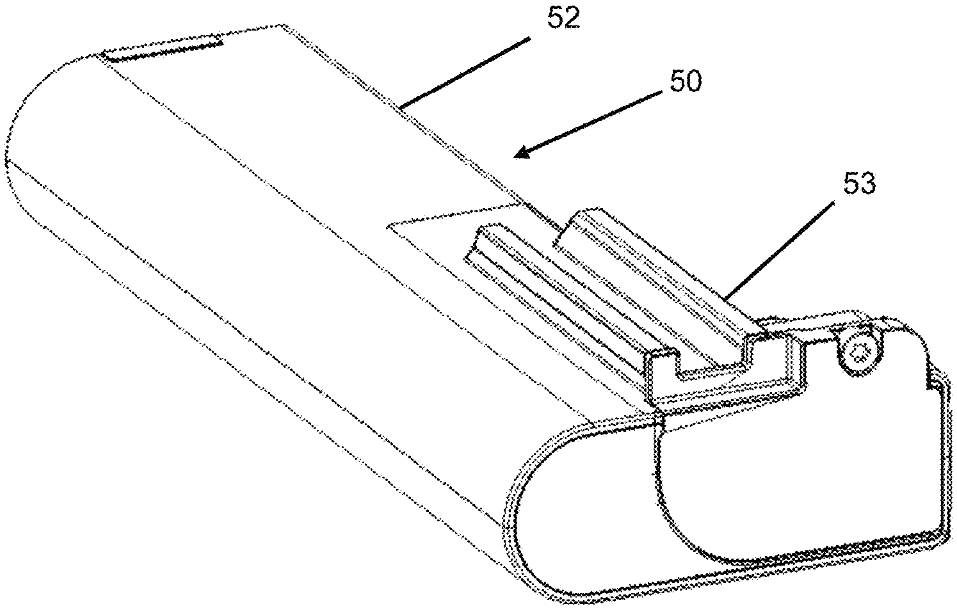
FIG. 5A is a front perspective view of a power unit for use in the powered air purifying respirator assembly of FIG. 1A.
Figure 5B:
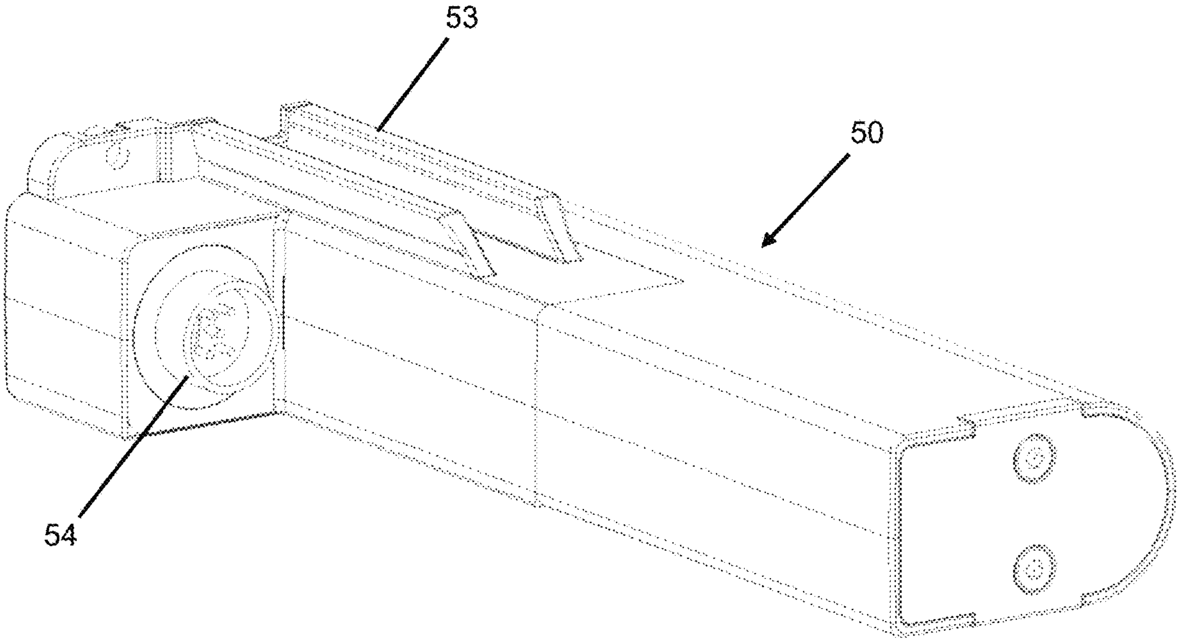
FIG. 5B is a rear perspective view of the power unit of FIG. 5A.
Figure 6:
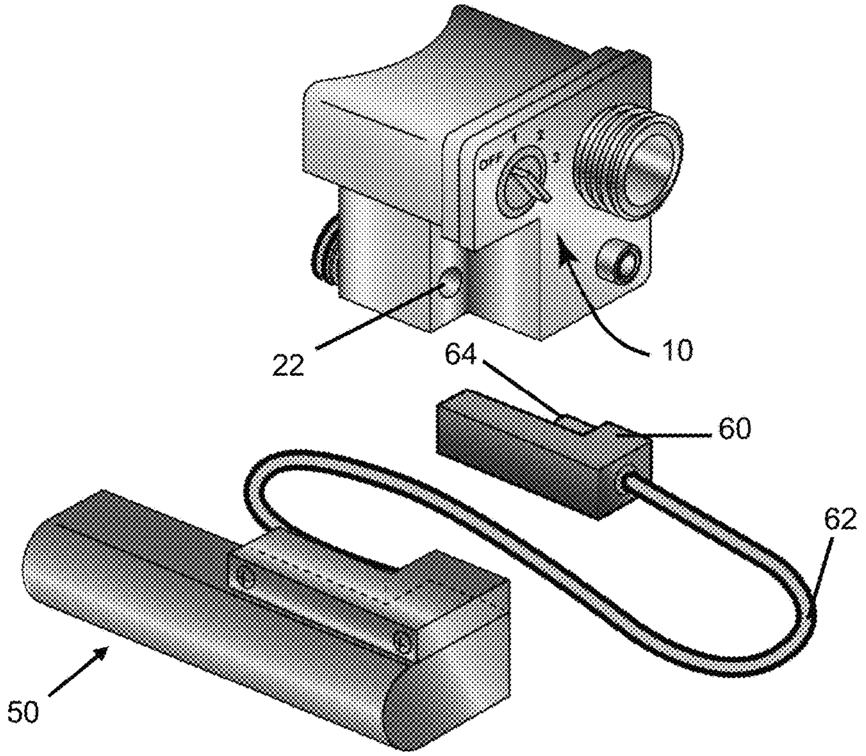
FIG. 6 is a front perspective view of a blower and power unit according to further aspects of an embodiment of the invention.
Figure 7:
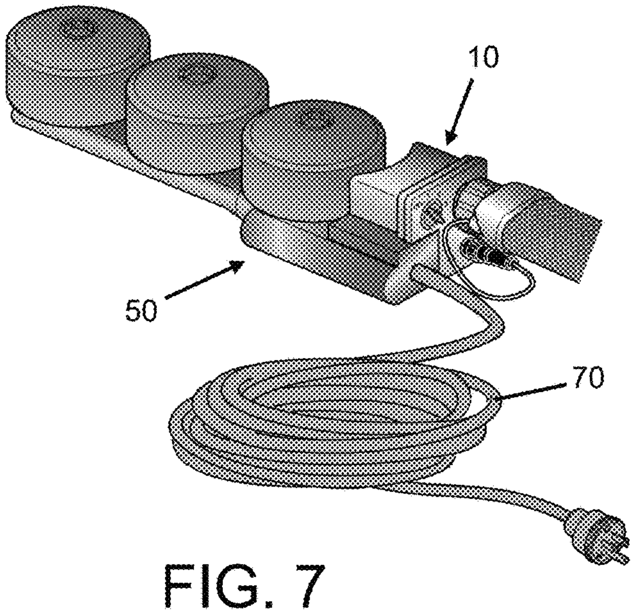
FIG. 7 is a front perspective view of a powered air purifying respirator assembly in accordance with further aspects of an embodiment of the invention.

With reference to FIGS. 1A and 1B and in accordance with certain aspects of an embodiment, a modular, integrated powered air purifying respirator ("PAPR") system is provided including a blower unit 10, a filter rail chassis 30 configured to receive filter canisters 36, such as CBRN filter canisters, a power assembly 50 for powering the blower, and a hose assembly 100 for interconnecting the blower with a protective mask.

With reference to FIGS. 1A-4B, blower unit 10 includes an inlet port 12 that receives an outlet end 32 of filter rail chassis 30 in an air-tight connection. Blower unit 10 includes a motor operating a fan 11 (FIG. 4A-4B) that draws air through filter rail chassis 30, outward through outlet end 32 of filter rail chassis 30, and into inlet port 12 of blower unit 10. Filter rail chassis 30 also includes one or more filter canister ports 34, each of which may removably receive a filter canister 36, such as a CBRN filter canister having a configuration that is well known to persons of ordinary skill in the art. As blower unit 10 is operating, air is drawn through filter canisters 36 into filter canister ports 34, during which process air is cleaned of contaminants. Such cleaned air then travels from filter canister ports 34 through the body of filter rail chassis 30 towards blower unit 10, into inlet port 12 of blower unit 10, and out of an outlet port 14 into hose assembly 100 for ultimate delivery to an operator's protective mask.

Filter rail chassis 30 has a slim body configuration such that the width of filter rail chassis 30 does not extend outside of the diameter of filter canisters 36. While the outlet end 32 of filter rail chassis 30 has a width that is complementary to the width of inlet port 12 of blower unit 10, the more distal sections of filter rail chassis 30 may have an even slimmer profile to further minimize the carrying load and impact on the operator. Further, filter rail chassis 30 may be provided with three or more filter canister ports 34, two filter canisters ports 34, or even one filter canister port 34, thus allowing an operator to choose a configuration that best suits their operating environment while allowing them the maximum ability to minimize the profile of the filter rail chassis 30 and to adapt the system to the current operational needs. As filter rail chassis 30 is detachable from blower unit 10, a modular system may be provided allowing the operator to select the appropriately sized filter rail chassis 30 (i.e., one filter, two filters, three filters, etc.) for their particular mission. Preferably, outlet end 32 of filter rail chassis 30 may removably receive a clip 32*a* to hold filter rail chassis 30 on inlet 12 of blower unit 10, which clip 32*a* may be manually removed when desired (e.g., to change filter rail chassis 30 from a two-filter configuration to a three-filter configuration or one-filter configuration).

To further aid in maintaining a compact profile, blower unit 10 may have a concave wall 16 that faces filter canisters 36 when attached to filter rail chassis 30. Preferably, concave wall 16 has a curvature that generally matches the curvature of the outer wall of a filter canister 36, such that the filter canister 36 closest to blower unit 10 may be positioned closer to blower unit 10 than if wall 16 were provided a planar configuration. Blower unit 10 also has a front wall 18 that holds outlet port 14, an operator switch 19 that allows an operator to regulate speed of the blower motor, and preferably a Smart Remote Switch ("SRS") connection 20 allowing connection of an SRS 120 on hose assembly 100, as discussed in greater detail below.

In accordance with certain aspects of an embodiment and with particular reference to FIGS. 1A and 1B, the SRS may be provided in one of two distinct configurations: a standalone configuration, where the SRS is contained in its own housing that connects to SRS connection 20 on blower unit 10, or a hose integrated configuration in which SRS 120 is affixed to hose assembly 100. The SRS 120 can thus function from two switches; namely, onboard or remote. Preferably, when the remote switch is in use, the onboard switch is disabled. In the remote, hose-integrated configuration, SRS 120 may comprise a two-position switch at the end of hose assembly 100 that attaches to the operator's mask, thus allowing easy and quick access for the operator. Remote SRS 120 may preferably have an "OFF" position, comprising a hard tactile (snap) maintained position, and an "ON/SET" position, comprising a tactile momentary position. When set to "OFF", the PAPR is off. When the operator first presses "ON/SET" from the "OFF" position, the PAPR is turned on to a programed setting <SETTING 1> or <LAST> (see the program selection discussion below). Likewise, each additional "ON/SET" press sets the PAPR to the next programed setting <SETTING X>.

Thus, and by way of non-limiting example, starting from the "OFF" position, if the "ON/SET" is pressed three times, the PAPR will run at the speed that is programed for <SETTING 3>.

Optionally, additional features may be incorporated into the SRS assembly, such as (by way of non-limiting example) indicators providing a visual signal indicating system conditions, such as low-flow or current flow, low-battery or general battery condition, etc.

Similarly, manual onboard blower/filter rail switch 19 may comprise a rotary selector that may provide, by way of non-limiting example, four position settings, such as "OFF", "Setting-1", "Setting-2", and "Setting-3" (each such setting indicating a different operating speed or other operating condition for blower unit 10, and each being the same as the conditions programmed for remote SRS 120).

In accordance with certain aspects of a particular embodiment, the system will allow operators to define the number of speed settings that may be achieved by blower unit 10, and the function/flow for each. Such programming may be carried out through SRS connection 20, such as by way of connecting a PC or other computing device to SRS connection 20. In certain configurations, the PC or other computing device may include software allowing each <SETTING> to be programed to preferably any of the following exemplary settings: (i) a constant flow rate having a range defined by the blower operational window for a given number of filter canisters 36; and (ii) BRR (Breath Rate Response), defined by the number of filter canisters 36, and available as an offset from default parameters used to increase the flow level over the BRR curve.

The PC or other computing device may further include software allowing the setting of "First ON/OFF", which may be set to either start at <SETTING 1> or start at the last setting used before "OFF". Further, the PC or other computing device may include software allowing a cycle after the last setting. For example, if there are four settings programed after the ON/SET has been pressed four times, the unit may be configured such that upon the fifth press, the unit will either do nothing regardless of the number of ON/SETs pressed, as follows:

| ON?SET | 1$^{st}$ | 2$^{nd}$ | 3$^{rd}$ | 4$^{th}$ | 5$^{th}$ | 6$^{th}$ | . . . |
|---|---|---|---|---|---|---|---|
| <SETTING> | 1 | 2 | 3 | 4 | 4 | 4 | 4 |

or alternatively the unit will cycle back down, so on the fifth press the unit would cycle back down to the third setting, and so on, as follows:

| ON?SET | 1$^{st}$ | 2$^{nd}$ | 3$^{rd}$ | 4$^{th}$ | 5$^{th}$ | 6$^{th}$ | 7$^{TH}$ | 8$^{TH}$ | 9$^{TH}$ |
|---|---|---|---|---|---|---|---|---|---|
| <SETTING> | 1 | 2 | 3 | 4 | 3 | 2 | 1 | 2 | 3 |

As mentioned above and with particular reference to FIGS. 5A-7, the modular integrated PAPR system includes a power assembly 50 for powering blower unit 10. With regard to a particular embodiment, power assembly 50 may comprise a battery pack that may be mounted, such as removably mounted, to the housing of blower unit 10. In this regard, battery pack 50 may have an interior wall 52 that matches the contour of the housing of blower unit 10 and at least part of the outer edge of filter rail chassis 30. More particularly, a first portion of interior wall 52 may be planar to match a sidewall portion of the housing of blower unit 10, with at least a portion of the battery pack positioned below the housing of blower unit 10.

Battery pack 50 preferably has a pin assembly 54 that mates with a power port 22 on blower unit 10, which allows pin assembly 54 to engage a power circuit inside of blower unit 10 to power the blower motor. Optionally, a battery pack adapter 60 may be provided and positioned in series between battery pack 50 and battery port 22 on blower unit 10. Such use of a battery pack adapter 60 allows quick replacement of one battery pack 50 for another when it has been expended, without requiring the operator to manipulate the battery pack 50 when attached to blower unit 10. A cable 62 may removably receive pin 54 of battery pack 50 allowing quick connect and disconnect of one battery pack 50 for another. Such cable 62 likewise allows the operator to carry battery pack 50 on their body at a remote location from blower unit 10 and chassis 30, thus even further offering the operator opportunity to minimize the profile of the blower unit 10 and chassis 30. Battery pack adapter 60 also has a pin 64 generally of the same configuration as pin 54 on battery pack 50, which pin 64 similarly engages power port 22 on blower unit 10.

Still further, battery pack 50 may optionally include a removable cable 70 (FIG. 7) allowing battery pack 50 to be connected to a power source, such as an AC or DC power source for purposes of both charging battery pack 50 and directly powering blower unit 10. Alternatively, battery pack 50 may be hardwired with such a power cable 70. Battery pack 50 may be configured to delivery external power to blower unit 10 when connected to an outside power source, and to automatically switch to battery power when disconnected from an outside power source.

Further, while removable from blower unit 10, battery pack 50 may have removable fasteners, such as screws, bolts, or the like, that hold battery pack 50 to the housing of blower unit 10 to ensure a secure connection between those elements. In a particularly preferred configuration, the top of battery pack 50 may include a guide rail 53 that engages a push latch 17 on an underside of the housing of blower unit 10, such that battery pack 50 may slide and click into position on the underside of the housing of blower unit 10 and remain held in place, while allowing a user to push downward on push latch 17 to enable battery pack 50 to be slid outward along guide rail 53 and ultimately removed from blower unit 10.

Figure 8:
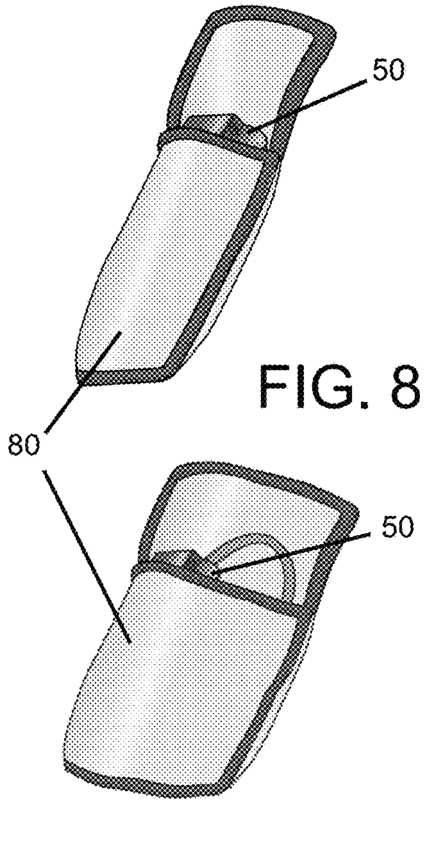
FIG. 8 are views of a pouch for remote storage of a power unit according to certain aspects of an embodiment of the invention.

In each of the above cases, as battery pack 50 may be removable from blower unit 10, it may be carried by the operator remote from blower unit 10 and chassis 30, such as in a pouch 80 (FIG. 8).

Figure 9:
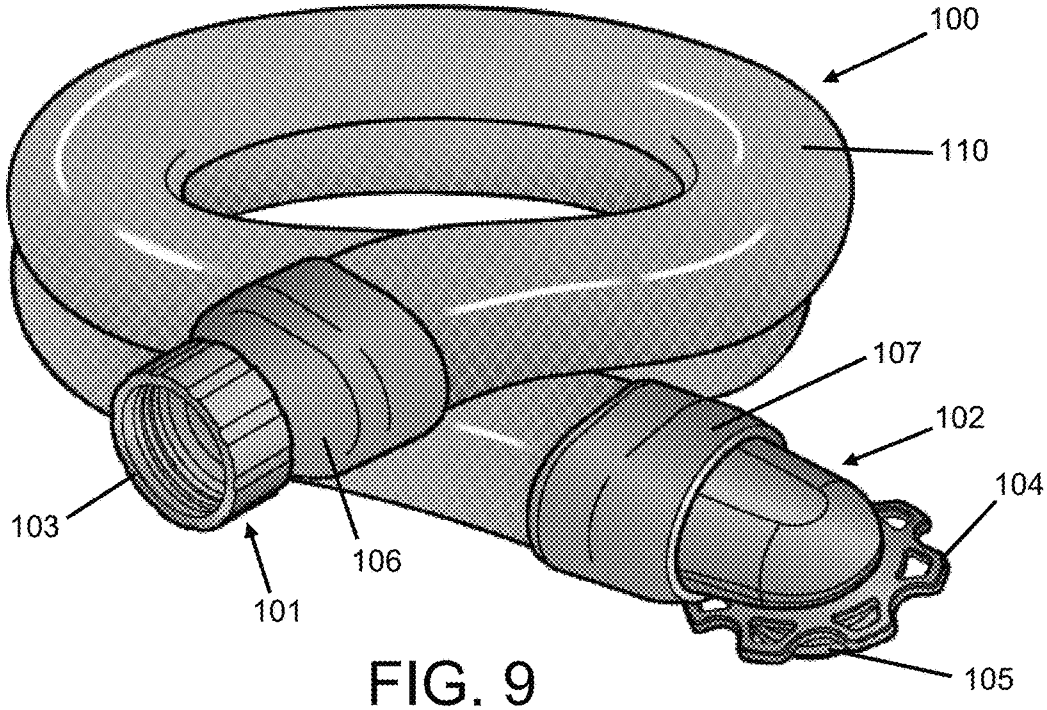
FIG. 9 is a perspective view of a hose system for use with the powered air purifying respirator assembly of FIG. 1A.
Figure 10:
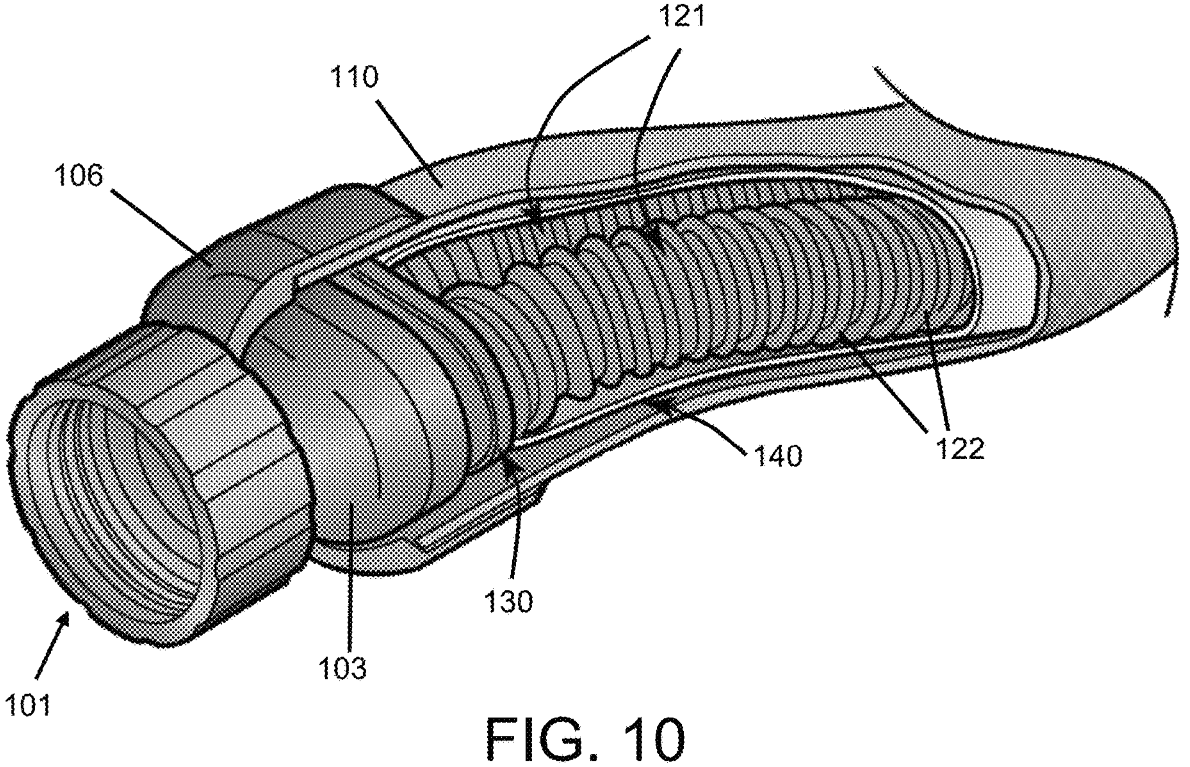
FIG. 10 is a close-up, partial sectional view of a portion of the hose system of FIG. 9.
Figure 11:
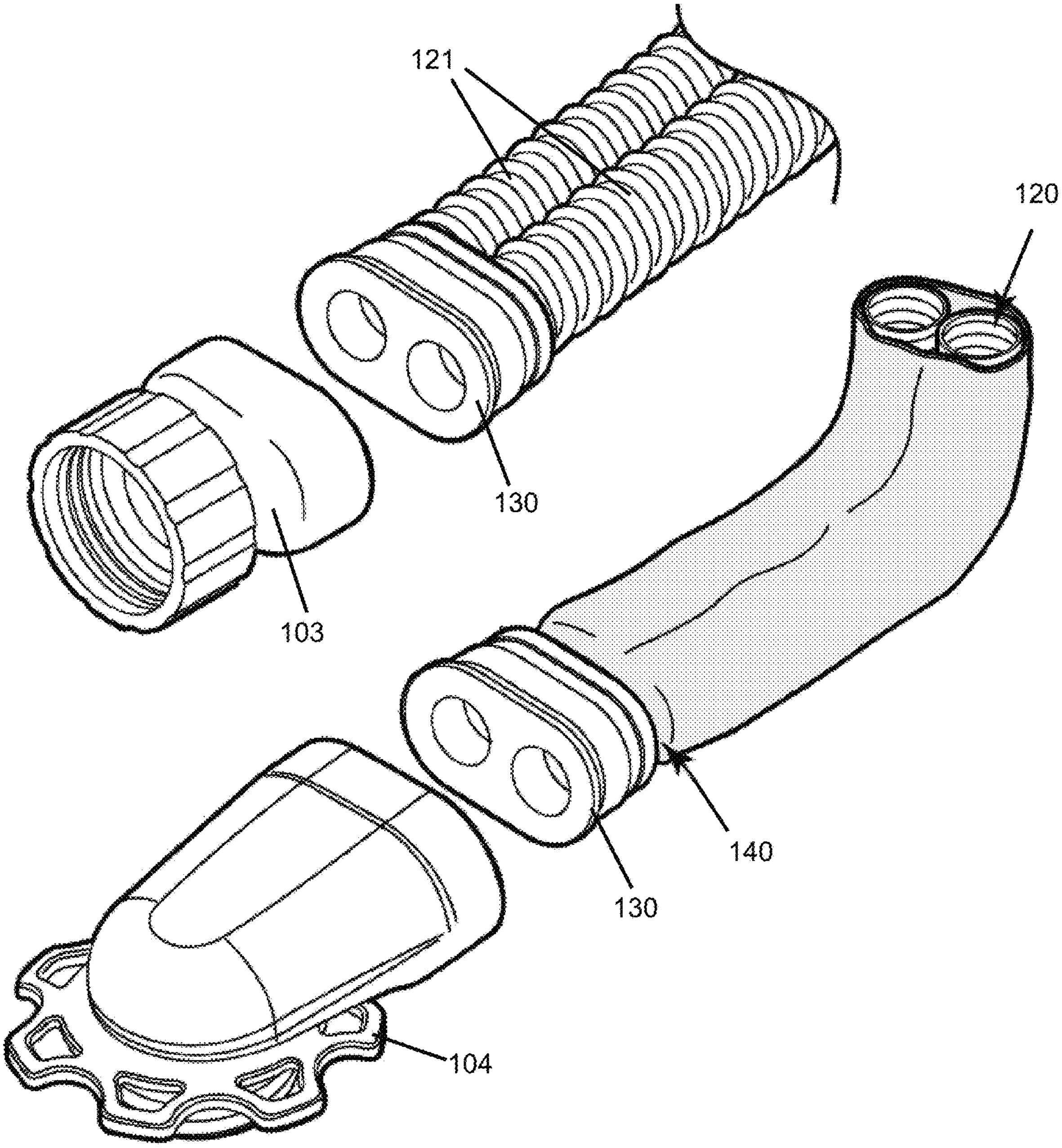
FIG. 11 is an exploded view of inlet and outlet ends of the hose system of FIG. 9.

As mentioned above and with particular reference to FIGS. 9-11, hose system 100 provides a conduit of breathable air from blower unit 10 to a connection port on an operator's protective mask. Hose system 100 has a first end 101 configured for connection to outlet port 14 on blower unit 10, and a second end 102 configured for connection to an inlet port on the exterior of the operator's protective mask. More particularly, first end 101 includes a rotatable coupling 103 that forms a straight connection with outlet port 14 on blower unit 10. Likewise, second end 102 includes a rotatable coupling 104 holding an outlet 105 that provides a 90° Connection from hose system 100 to the operator's protective mask to still further minimize the profile of the modular, integrated PAPR system. A first flexible cuff 106, which in exemplary embodiments may be formed of rubber, and a second, similarly configured flexible cuff 107, each fit tightly over a tapered portion of rotatable coupling 103 and rotatable coupling 104, respectively, where each of them enter into outer tube 110. Preferably, outer tube 110 is welded to each of rubber cuff 106 and rubber cuff 107 to ensure an air-tight connection.

Outer tube 110 is sufficiently flexible so as to allow an operator to position and route the tube in the most desirable configuration for a given equipment configuration, while being formed of sufficiently heavy material to protect against tearing. Outer tube 110 is also oval in shape, which maintains a small, flat profile for the hose system 100 such that it may lay flat against the operator's body in an intended position and location without rolling and impeding the use of other operator-worn equipment. In certain exemplary configurations, outer tube 110 may be formed of a heavy-duty nylon, such as by way of non-limiting example CORDURA or NOMEX. Outer tube 110 may alternatively be formed of other abuse-protective flexible materials, such as KEVLAR or similarly configured materials. An outer surface of outer tube 110 may be preferably welded to an interior face of each of rubber cuff 106 and rubber cuff 107.

Preferably two circular cross-section air carrying conduits 121 are positioned inside of outer tube 110 to carry filtered air from blower unit 10 to the air inlet on the operator's protective mask. Circular air carrying conduits 121 may include reinforcing coils 122 extending about the outer perimeter of each conduit 121 to provide resistance against collapse of each independent conduit 121, such as when outer tube 110 is inadvertently compressed by other equipment carried by the operator. Moreover, providing two such circular air carrying conduits 121 provides the overall hose system 100 with a hoop stress that is significantly higher than if the entirety of the hose system 100 were simply a hollow oval. Thus, such assembly of ovular outer tube 110 with circular interior air carrying conduits [120] 121 allows a flat, low profile outer hose system that may rest against the operator's body, again aiding in reducing the overall profile of the hose system 100, while still ensuring protection against inadvertent kinking or closure of the air conduits. Still further, providing two interior circular air carrying conduits provides lower resistance to bending than if a single, larger circular conduit were provided, thus allowing the operator to route hose system 100 across their body in a way that is most appropriate and comfortable for a given equipment payload. In exemplary configurations, each air carrying conduit 121 preferably has an outer diameter of approximately 14-24 mm, more preferably about 19 mm, and a length of approximately 36 inches.

Each end of each air carrying conduit 121 is received in a fitting 130. Each fitting 130 is configured to deliver air between the two air carrying conduits 121 and one of first end 101 and second end 102 of hose system 100. An exterior wall of each fitting 130 is sized to fit tightly inside of an interior end of each of rotatable coupling 103 (at first end 101 of hose system 100) and the 90° connection of rotatable coupling 104. The exterior wall of each fitting may further be provided one or more sealing members, such as gaskets, O-rings, or the like, to provide a fluid- and gas-tight seal. In particularly preferred configurations, a CBRN-protective barrier sleeve 140 surrounds both air carrying conduits 121 to further protect the air carried by conduits 121 from contamination from harmful elements outside of hose system 100. In such configurations, CBRN-protective barrier 140 is sealed to each fitting 130 at each interior end of each fitting 130. CBRN-protective barrier 140 may, in certain exemplary embodiments, be formed of GORE-TEX, though a variety of other flexible, CBRN-protection capable materials may likewise be used without departing from the spirit and scope of the invention.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

What is claimed is:

1. A powered air purifying respirator ("PAPR") assembly, comprising:
   - a blower unit having an air inlet and an air outlet;
   - a hose system removably connected to said air outlet for delivery of cleaned air to a user, said hose system comprising:
     - two circular cross-section air carrying conduits extending between a hose inlet and a hose outlet; and
     - an oval shaped outer tube extending between said hose inlet and said hose outlet and enclosing said two circular cross-section air carrying conduits;

wherein said two circular cross-section air carrying conduits include reinforcing coils extending about an outer perimeter of each conduit to provide resistance against collapse.

2. The PAPR assembly of claim 1, further comprising:

a first rotatable coupling at said hose inlet;

a second rotatable coupling at said hose outlet;

a first flexible cuff affixed to said first rotatable coupling and having a first cuff inner surface, wherein a first end of said oval shaped outer tube is welded to said first cuff inner surface; and a second flexible cuff affixed to said second rotatable coupling and having a second cuff inner surface, wherein a second end of said oval shaped outer tube is welded to said second cuff inner surface.

3. The PAPR assembly of claim 2, further comprising:

a first fitting receiving a first end of each of said two circular cross-section air carrying conduits and insertable into said first rotatable coupling to form a first fluid- and gas-tight seal; and a second fitting receiving a second end of each of said two circular cross-section air carrying conduits and insertable into said second rotatable coupling to form a second fluid- and gas-tight seal.

4. The PAPR assembly of claim 1, further comprising a CBRN-protective barrier tube surrounding said two circular cross-section air carrying conduits between said two circular cross-section air carrying conduits and said oval-shaped outer tube.

5. The PAPR assembly of claim 1, wherein each of said circular cross-section air carrying conduits has an outer diameter of approximately 14-24 mm.

6. The PAPR assembly of claim 1, further comprising:

a filter rail chassis having a first closed end and a second open end and removably attached to said air inlet of said blower unit at said second open end, said filter rail chassis having at least one chassis inlet configured to removably and sealingly receive a filter canister.

7. The PAPR assembly of claim 6, wherein said filter rail chassis has a width dimension that is smaller than an outer diameter of said filter canister.

8. The PAPR assembly of claim 6, wherein said blower unit includes a back wall having a concave portion with a radius of curvature matching a radius of curvature of an outer diameter of said filter canister.

9. The PAPR assembly of claim 1, further comprising:

a portable power assembly removably attached to said blower unit, said portable power assembly having a bottom face aligned with a bottom face of said blower unit.

10. The PAPR assembly of claim 9, further comprising:

a battery pack adapter connectable to a power port on said blower unit; and a power cable affixed to said battery pack adapter and connectable to said portable power assembly.

11. The PAPR assembly of claim 9, wherein said portable power assembly comprises:

a battery pack having an interior wall that matches a contour of a housing of said blower unit and at least part of an outer edge of said filter rail chassis;

a guide rail on said battery pack; and a push latch on an underside of said housing of said blower unit configured to engage said guide rail to removably secure said battery pack to said blower unit.

12. The PAPR assembly of claim 11, wherein said battery pack is configured to:

deliver external power to said blower unit when connected to an outside power source; and automatically switch to battery power when disconnected from said outside power source.

13. The PAPR assembly of claim 1, further comprising:

a smart remote switch connecting port on said blower unit; and a smart remote switch removably connected to said smart remote switch connecting port.

14. The PAPR assembly of claim 13, wherein an actuator of said smart remote switch is affixed to said hose system adjacent to said hose outlet.

15. The PAPR assembly of claim 13, wherein said smart remote switch comprises:

an OFF position comprising a hard tactile maintained position; and an ON/SET position comprising a tactile momentary position.

16. The PAPR assembly of claim 15, wherein:

when said smart remote switch is in said ON/SET position, said blower unit operates at a programmed speed setting; and when said smart remote switch is operated remotely, an onboard switch on said blower unit is disabled.

17. The PAPR assembly of claim 16, wherein:

said programmed speed setting is selectable from multiple programmed settings; and each subsequent actuation of said ON/SET position cycles said blower unit through said multiple programmed settings.

* * * * *